US006774910B2

(12) United States Patent
Lewis

(10) Patent No.: US 6,774,910 B2
(45) Date of Patent: *Aug. 10, 2004

(54) METHOD AND SYSTEM FOR PROVIDING IMPLICIT EDGE ANTIALIASING

(75) Inventor: Michael C. Lewis, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/267,356

(22) Filed: Oct. 8, 2002

(65) Prior Publication Data

US 2003/0038819 A1 Feb. 27, 2003

Related U.S. Application Data

(63) Continuation of application No. 09/589,673, filed on Jun. 7, 2000, now Pat. No. 6,509,897, which is a continuation of application No. 09/296,999, filed on Apr. 22, 1999, now Pat. No. 6,285,348.

(51) Int. Cl.$^7$ ............................................. G06T 5/00
(52) U.S. Cl. ..................... 345/611; 345/422; 345/613; 345/614; 345/545
(58) Field of Search ....................... 345/422, 611–614, 345/418–421, 426, 596, 606–610, 618–620, 626–630, 501, 520, 522, 530, 545–549, 563; G06T 5/00, 15/00

(56) References Cited

U.S. PATENT DOCUMENTS

| 5,237,650 | A |   | 8/1993 | Priem et al. |
| 5,253,335 | A | * | 10/1993 | Mochizuki et al. ......... 345/422 |
| 5,394,516 | A |   | 2/1995 | Winser |
| 5,471,567 | A |   | 11/1995 | Soderberg et al. |
| 5,926,181 | A | * | 7/1999 | Lewis et al. ................ 345/421 |
| 5,929,862 | A | * | 7/1999 | Barkans ...................... 345/613 |
| 5,943,060 | A | * | 8/1999 | Cosman et al. ............. 345/613 |
| 5,949,428 | A | * | 9/1999 | Toelle et al. ................ 345/589 |
| 5,963,210 | A | * | 10/1999 | Lewis et al. ................ 345/419 |
| 6,128,000 | A | * | 10/2000 | Jouppi et al. ............... 345/614 |
| 6,285,348 | B1 | * | 9/2001 | Lewis ......................... 345/614 |
| 6,369,828 | B1 | * | 4/2002 | Lewis ......................... 345/611 |
| 6,509,897 | B1 | * | 1/2003 | Lewis ......................... 345/422 |

* cited by examiner

*Primary Examiner*—Matthew C. Bella
*Assistant Examiner*—Wesner Sajous
(74) *Attorney, Agent, or Firm*—Sawyer Law Group LLP

(57) ABSTRACT

A method and system for providing antialiasing of a graphical image on a display from data describing at least one object is disclosed. The display includes a plurality of pixels. The method and system include providing a plurality of fragments for the at least one object. A portion of the plurality of fragments intersects a pixel of the plurality of pixels. Each of the plurality of fragments includes a depth value, a slope of the depth value, and an indication of a portion of a corresponding pixel that is intersected. The method and system include calculating a plurality of subpixel depth values for a fragment of the plurality of fragments. The plurality of subpixel depth values is calculated using the depth value and the slope of the depth value of the fragment. The method and system include determining whether to store a portion of the fragment based on the plurality of subpixel depth values for the fragment and the indication of the extent the corresponding pixel is intersected by the fragment. The method and system also include storing the portion of the fragment if it has been determined that the portion of the fragment is to be stored. The method and system also include repeating the calculating, determining, and storing steps for each remaining fragment in the portion of the plurality of fragments. The method and system also include providing antialiased data for the pixel based on a second portion of the plurality of fragments that have been stored.

10 Claims, 7 Drawing Sheets

METHOD AND SYSTEM FOR PROVIDING IMPLICIT EDGE ANTIALIASING

CROSS-REFERENCE TO RELATED APPLICATIONS

The present application is a continuation of prior application Ser. No. 09/589,673 filed on Jun. 7, 2000 now U.S. Pat. No. 6,509,897 which is a continuation of prior application Ser. No. 09/296,999 filed on Apr. 22, 1999 now issued as U.S. Pat. No. 6,285,348 on Sep. 4, 2001.

The present invention is related co-pending U.S. patent application Ser. No. 09/239,413, entitled "METHOD AND SYSTEM FOR PROVIDING EDGE ANTIALIASING" filed on Jan. 28. 1999 and assigned to the assignee of the present application.

The present invention is also related to co-pending U.S. patent application Ser. No. 09/307,317, entitled "METHOD AND SYSTEM FOR PROVIDING EDGE ANTIALIASING USING A SINGLE BLENDING UNIT" filed on May 7, 1999 and assigned to the assignee of the present application. The present invention is related co-pending U.S. patent application Ser. No. 08/624,261, entitled "METHOD AND APPARATUS FOR IDENTIFYING AN ELIMINATING THREE-DIMENSIONAL OBJECTS VISUALLY OBSTRUCTED FORM A PLANAR SURFACE" filed on Mar. 29, 1996 and assigned to the assignee of the present application. The present invention is also related to co-pending U.S. patent application Ser. No.08/624,260, entitled "GRAPHICS PROCESSORS, SYSTEM AND METHOD FOR GENERATING SCREEN PIXELS IN RASTER ORDER UTILIZING A SINGLE INTERPOLATOR" filed on Mar. 29, 1996 and assigned to the assignee of the present application. The present invention is also related to U.S. Pat. Nos. 6,285,348 and 6,509,673, assigned to the assignee of the present application.

FIELD OF THE INVENTION

The present invention relates to displaying graphical image on a computer system and more particularly to a method and system for providing antialiasing of implicit edges while maintaining processing speed and using less memory.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons. A conventional system then renders the polygons in a particular order. For a three-dimensional scene, the opaque polygons are generally rendered from front to back as measured from the viewing plane of the display. Translucent polygons are desired to be rendered from back to front. Similarly, a two-dimensional scene can be displayed. In such a case, polygons are rendered based on their layer. Shallower layers occlude deeper layers.

Each of the polygons includes mathematically defined edges. When rendering an image, the conventional system often renders diagonal lines or polygon edges that are not perfectly horizontal or vertical. Because each pixel has finite physical dimensions, edges which are not horizontal or vertical may appear jagged. For example, consider each pixel to be a square. A diagonal line or edge rendered using the square pixels will appear jagged, similar to a staircase. This effect is known as aliasing.

Implicit edges are edges that are visible in a graphical image, but that are not explicitly defined. For example, in a graphical image, objects may intersect each other. The intersection appears as an edge that is not explicitly defined. Implicit edges are due to differences in depth values of the polygons whose intersection forms the implicit edge. The depth value can include the distance from the viewing plane, a w value, or layer order. The depth values at the implicit edge, the intersection of the polygons, should be virtually identical. However, slight differences in depth values of the polygons from one pixel to the next dictate which polygon is visible at a selected pixel. Because of these slight differences in depth values, the polygon considered to be visible can change from pixel to pixel. This creates the implicit edge. Each pixel still has a finite area. As a result, the implicit edge is also subject to aliasing.

In order to reduce aliasing, conventional systems perform antialiasing. Antialiasing helps reduce the effect that the physical dimension of the pixels has on the appearance of objects being displayed. Diagonal lines and edges appear smoother. It would be desirable if the antialiasing performed is also capable of providing antialiasing for implicit edges.

Some conventional systems utilize conventional supersampling in order to perform antialiasing for implicit edges. Supersampling is typically performed for a portion of the display, called a tile, or the entire display at a time. Each pixel in the tile or display is considered to be an M×N matrix subpixels. Data for each polygon in the tile is evaluated at each subpixel. Thus, the depth value, color, texture, and other data for the polygon can differ in and is evaluated at each subpixel. Data for the subpixels in each pixel in the tile are combined to provide the data for each pixel in the tile. Because supersampling evaluates and combines depth values for subpixels, supersampling can help smooth out the stair-casing effect on implicit edges. However, the system requires sufficient memory to retain data for the M×N subpixels in each pixel in a tile to perform supersampling. Therefore, a large amount of memory is required. It must also be ensured that there are not artifacts at the seams between tiles. This slows processing. Furthermore, much more data is processed for each pixel in the display. Supersampling is thus computation intensive and relatively slow.

Some conventional systems address some of the problems in supersampling by performing adaptive supersampling. Adaptive supersampling first identifies areas where supersampling may be desired, for example at an implicit edge. Once the area of an implicit edge is identified, supersampling is performed for a tile in the region of the implicit edge. In areas where there are no implicit edges, supersampling is not performed. Although adaptive supersampling improves processing speed by reducing the areas subjected to supersampling, a large amount of memory is still required.

Accordingly, what is needed is a system and method that is capable of providing antialiasing for implicit edges and which consumes less memory. The present invention addresses such a need.

SUMMARY OF THE INVENTION

The present invention provides a method and system for providing antialiasing of a graphical image on a display from data describing at least one object. The display includes a plurality of pixels. The method and system comprise providing a plurality of fragments for the at least one object. A portion of the plurality of fragments intersects a pixel of the plurality of pixels. Each of the plurality of fragments includes a depth value, a slope of the depth value, and a portion of a corresponding pixel that is intersected. The method and system comprise calculating a plurality of subpixel depth values for a fragment of the plurality of fragments. The plurality of subpixel depth values is calculated using the depth value and the slope of the depth value of the fragment. The method and system comprise determining whether to store a portion of the fragment based on the plurality of subpixel depth values for the fragment and the indication of the extent the corresponding pixel is intersected by the fragment. The method and system also comprise storing the portion of the fragment if it has been determined that the portion of the fragment is to be stored. The method and system also comprise repeating the calculating, determining, and storing steps for each remaining fragment in the portion of the plurality of fragments. The method and system also comprise providing antialiased data for the pixel based on a second portion of the plurality of fragments that have been stored.

According to the system and method disclosed herein, the present invention can provide antialiasing for implicit edges. The antialiasing is provided without requiring a frame buffer or z-buffer. Furthermore, the present invention does not slow processing of the image by requiring an inordinate number of calculations.

DETAILED DESCRIPTION OF THE INVENTION

The present invention relates to an improvement in rendering graphical images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
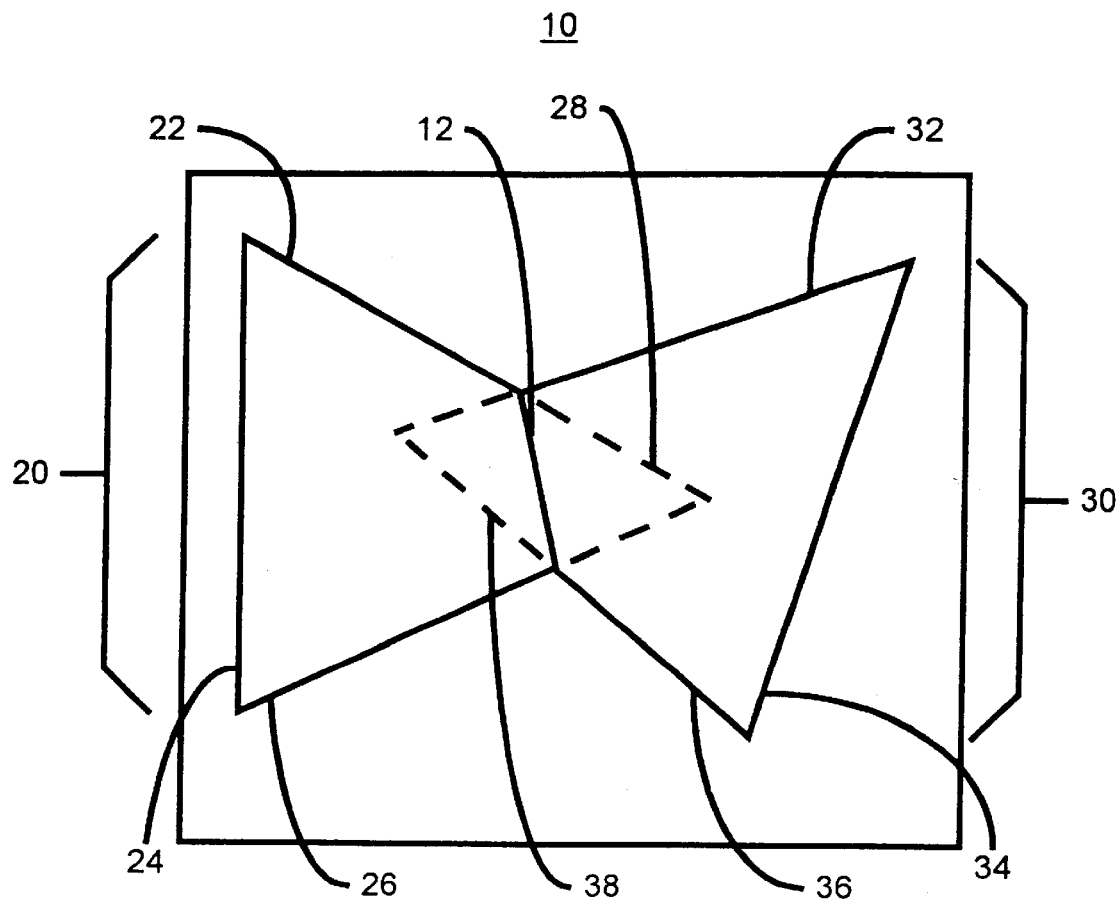
FIG. 1A is a diagram of a graphical image including an implicit edge.
Figure 1B:
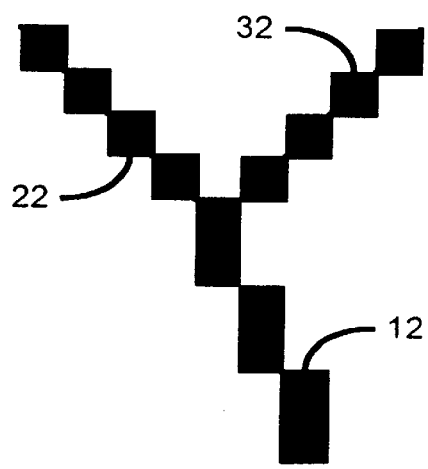
FIG. 1B is a closer view of the implicit edge shown in FIG. 1A.

FIG. 1A is a diagram of a graphical image on a display 10 containing two intersecting polygons 20 and 30. The polygons 20 and 30 may be part of objects which are part of a graphical image being shown on the display 10. The first polygon 20 includes edges 22, 24, and 26. The second polygon 30 includes edges 32, 34, and 36. The edges 22, 24, 26, 32, 34, and 36 are, therefore, explicitly defined. At the intersection of the polygons 20 and 30, there is an implicit edge 12. The implicit edge 12 is not explicitly defined, but is due to the intersection of polygons 20 and 30. Portion 28 of the polygon 20 is partially occluded by the polygon 30. Portion 38 of the polygon 30 is partially occluded by the polygon 20. FIG. 1B depicts a closer view of a portion of the implicit edge 12. The pixels in the display have a finite area and are depicted as squares. Because the pixels in the display 10 have a finite size, the edges 22 and 32 as well as the implicit edge 12 are jagged.

Figure 2:
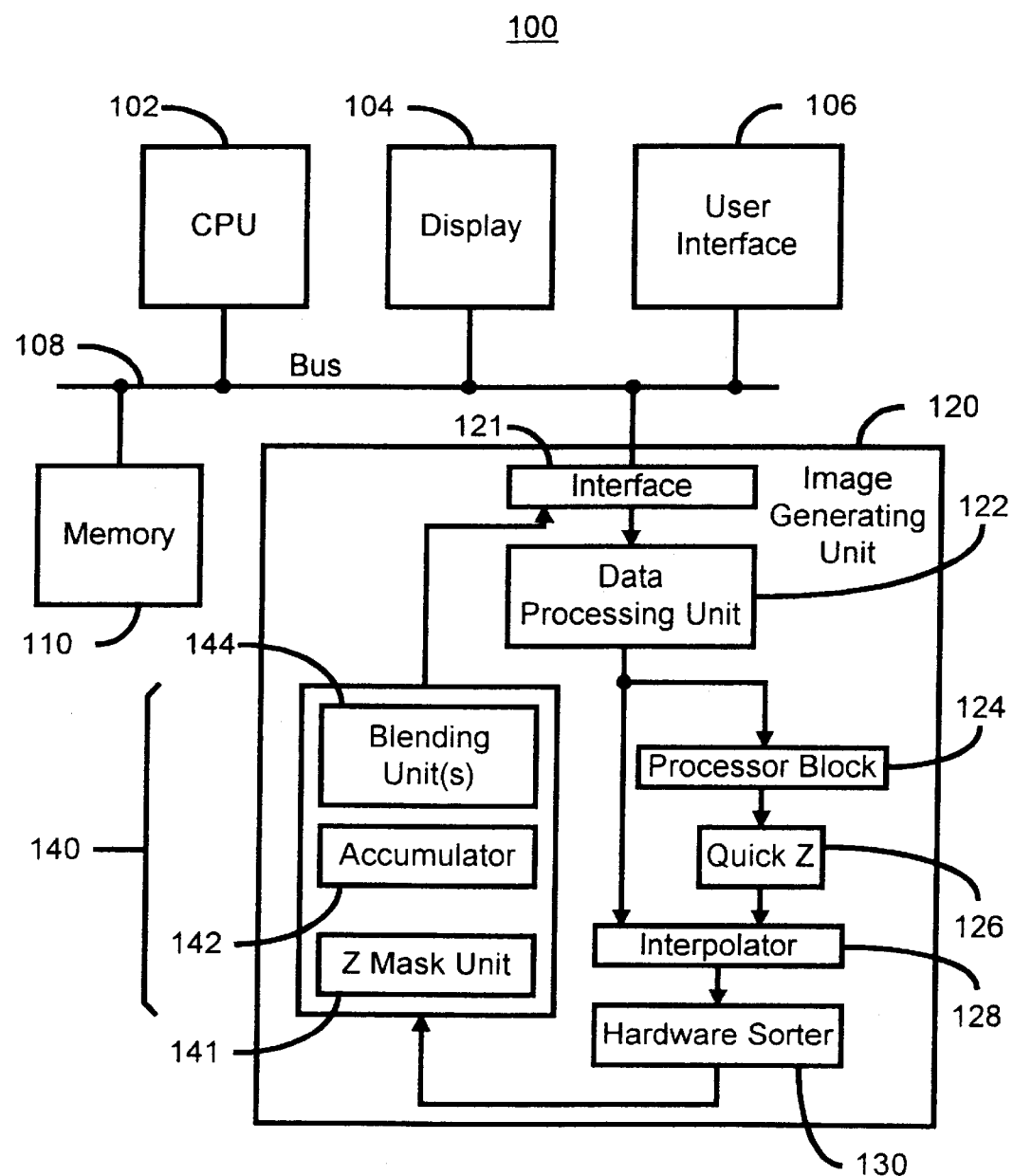
FIG. 2 is a block diagram depicting a computer graphics system in accordance with the present invention.

FIG. 2 depicts a simplified block diagram of one embodiment of a computer graphics system 100 with which the present invention is used. Portions of the computer system 100 are described more completely in co-pending U.S. patent application Ser. No. 08/624,261 entitled "Method and Apparatus for Identifying and Eliminating Three-Dimensional Objects Visually Obstructed from a Planar Surface" filed on Mar. 29, 1996. Applicant hereby incorporates by reference the above-mentioned co-pending application. The present invention is also related to co-pending U.S. patent application Ser. No. 08/624,260 entitled "Graphics Processors, System and Method for Generating Screen Pixels in Raster Order Utilizing a Single Interpolator" filed on Mar. 29, 1996. Applicant hereby incorporates by reference the above-mentioned co-pending application.

The computer graphics system 100 includes a central processing unit (CPU) 102, a display 104, a user interface 106 such as a keyboard or mouse or other communicating device, a memory 110, and an image generating unit 120 coupled with a bus 108. The display 104 includes a plurality of pixels, not shown. Each of the plurality of pixels has an area. The display 104 could include a display memory (not shown) to which pixels are written. For example, the display 104 could include a frame buffer. However, the present invention can also be implemented without a frame buffer. However, nothing prevents the method and system from being implemented in a different computer system having other components. The system 100 is used to display objects, particularly three-dimensional objects. In order to do so, each of the objects is preferably broken into polygons to be used in rendering the objects. In a preferred embodiment, the polygons are rendered in raster order. That is, portions of the polygons are rendered in the order of the pixels in the display 104.

The image generating unit 120 includes an interface 121 connected to the bus 108. The interface 121 transmits data to a data processing unit 122. A processor block 124 is coupled with the data processing unit 122. The processor block 124 identifies data describing portions of polygons ("intersecting polygons") which intersect the area extending along a z-axis from a selected pixel in an x-y plane corresponding to a screen of the display 104. In a preferred embodiment, the processor block 124 includes a sufficient number of processors to have a separate processor for each intersecting polygon. Consequently, the intersecting polygons can be processed in parallel. The data for with the portion of the intersecting polygon associated with the selected pixel is termed a fragment. For example, a fragment includes the color, texture, and depth value for the corresponding polygon. Data relating to each selected pixel includes a fragment for each of the intersecting polygons. In the context of this disclosure, a fragment for an intersecting polygon will be described as intersecting the pixel that the polygon intersects. The processor block 124, therefore, provides and indication of the fragments that intersect a pixel currently being processed.

An obstructed object identifier/removal unit 126 receives at least a portion of the fragment from each intersecting polygon associated with the selected pixel and removes portions of the fragments for the intersecting polygons which are obstructed. In one embodiment, the obstructed objected identifier/removal unit 126 performs this function by indicating to the interpolator which fragments are valid (unobstructed) and which fragments are invalid (obstructed). In a preferred embodiment, the obstructed object identifier/removal unit 126 performs this function without determining the precise z-value of the polygon.

The interpolator 128 receives the fragments for the intersecting polygons for the selected pixel and interpolates the data, including interpolating texture, color, and alpha values for the fragment. The interpolator 128 also provides a mask, discussed below, for each fragment. Although mask generation can be considered logically distinct from interpolation, the mask is preferably generated by a sub-block (not shown) of the interpolator 128. However, in an alternate embodiment, mask generation can be provided by another unit. The mask can be considered part of the fragment for an intersecting polygon. Because the obstructed object identifier/removal unit 126 has removed fragments for obstructed objects, the interpolator 128 may perform its function for only those intersecting polygons which are not obstructed. The fragments for these remaining intersecting polygons are provided by the interpolator 128 to a hardware sorter 130. The hardware sorter 130 sorts the fragments for the intersecting polygons based on the value of a key associated with the fragment. Preferably, the key is the z value, or depth value, for the fragment at the selected pixel. Note, however, that the present invention is consistent with other sorts or with no sort.

The sorted fragments for the selected pixel are then provided to an antialiasing unit 140. In a preferred embodiment, the antialiasing unit 140 includes a z mask unit 141, an accumulator 142, and blending unit(s) 144. The accumulator 142 includes subpixel buffers, not shown in FIG. 2. In a preferred embodiment, the accumulator 142 includes a separate subpixel buffer for each subpixel into which a pixel is divided. In a preferred embodiment, a single blending unit 144 is used. In an alternate embodiment, multiple blending units 144 can be used. The antialiased data for the selected pixel is provided to the display 104. Subsequent pixels are then identified as the selected pixel being processed, preferably in raster order. The fragments intersecting these pixels are processed similarly. Thus, the objects in the graphical image can be rendered in raster order.

Antialiasing using the masks provided by the interpolator 128 is described in co-pending U.S. patent application Ser. No. 09/239,413, entitled "METHOD AND SYSTEM FOR PROVIDING EDGE ANTIALIASING" (JAS 945P) filed on Jan. 28, 1999 and assigned to the assignee of the present application. Applicant hereby incorporates by reference the above-mentioned co-pending application.

In the above-mentioned co-pending application, each fragment includes but is not limited to a mask and a depth value. The mask indicates a portion of the pixel that the fragment intersects. Thus, the mask is hereinafter referred to as a coverage mask. The coverage mask is used to determine the contribution a fragment makes to the pixel it intersects. For example, each pixel can be broken into subpixels. The coverage mask indicates which of the subpixels the fragment intersects. Where a particular pixel includes an edge of a polygon, such as the edge 122, the coverage mask for the fragment indicates that the fragment only intersects some of the subpixels. The fragment is blended only in these subpixels. In order to blend the fragment, the accumulator 142 and blending units 144 are used. Each subpixel buffer in the accumulator 142 is used to store information-for fragments contained in each of the subpixels within the selected pixel. In a preferred embodiment, the data in the subpixel buffers in the accumulator 142 is averaged. The antialiased data for the selected pixel is then provided to the display 104.

Although the method and system described in the above-mentioned co-pending application functions adequately for its intended purpose, antialiasing of implicit edges may not be adequately addressed. Although the coverage mask for a fragment indicates the subpixels that the fragment actually intersects, the remaining data in each fragment in the above-mentioned co-pending application contains data which is presumed to be identical in every subpixel. Thus, depth value is the same for each subpixel in a selected pixel. Implicit edges are due to differences in the depth value for polygons, such as the polygons 20 and 30. Thus, the antialiasing described in the above-mentioned co-pending application may not adequately antialias implicit edges. Accordingly, what is needed is a method and system for providing antialiasing which is capable of antialiasing implicit edges.

The present invention provides a method and system for providing antialiasing of a graphical image on a display from data describing at least one object. The display includes a plurality of pixels. The method and system comprise providing a plurality of fragments for the at least one object. A portion of the plurality of fragments intersects a pixel of the plurality of pixels. Each of the plurality of fragments includes a depth value, a slope of the depth value, and an indication of a portion of a corresponding pixel that is intersected. The method and system comprise calculating a plurality of subpixel depth values for a fragment of the plurality of fragments. The plurality of subpixel depth values is calculated using the depth value and the slope of the depth value of the fragment. The method and system comprise determining whether to store a portion of the fragment based on the plurality of subpixel depth values for the fragment and the indication of the extent the corresponding pixel is intersected by the fragment. The method and system also comprise storing the portion of the fragment if it has been determined that the portion of the fragment is to be stored. The method and system also comprise repeating the calculating, determining, and storing steps for each remaining fragment in the portion of the plurality of fragments. The method and system also comprise providing antialiased data for the pixel based on a second portion of the plurality of fragments that have been stored.

The present invention will be described in terms of a particular computer system and processing fragments in a particular order. However, one of ordinary skill in the art will readily recognize that this method and system will operate effectively for other types of computer systems and processing fragments in another order. Furthermore, although the present invention is described in the context of antialiasing implicit edges, the present invention can be used in antialiasing other items, such as edges or lines. Furthermore, the present invention will be described in the context of specific blocks performing certain functions and methods performing certain steps in a particular order. However, one of ordinary skill in the art will readily realize that other blocks can provide these functions and that the steps may be performed in another order or in parallel.

Figure 3:
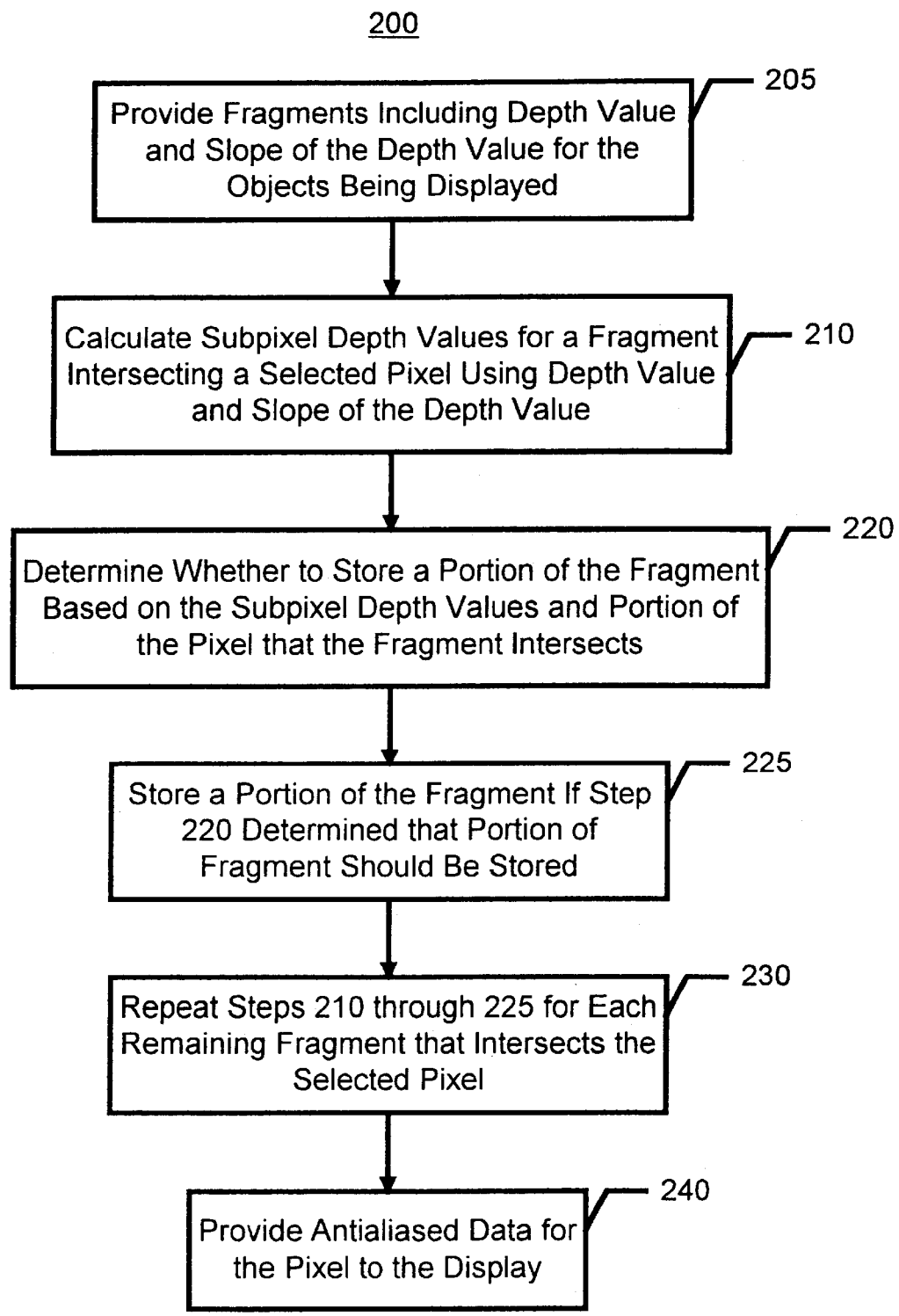
FIG. 3 is a high level flow chart depicting a method for providing a graphical display including antialiasing in accordance with the present invention.

To more particularly illustrate the method and system in accordance with the present invention, refer now to FIG. 3 depicting a high-level flow chart of one embodiment of a method 200 in accordance with the present invention. The method 200 provides antialiasing for fragments intersecting a selected pixel of the display 104. The method 200 preferably processes the fragments intersecting the selected pixel one at a time. Furthermore, each pixel can be divided into a plurality of subpixels. In a preferred embodiment, each pixel is divided into a four by four array of subpixels.

The fragments for the objects being displayed are provided, via step 205. Each of the fragments provided in step 205 includes a depth value, a slope of the depth value, and an indication of the portion of the pixel that the fragment intersects. In a preferred embodiment, each fragment includes the coverage mask, discussed above, as an indication of the extent to which the pixel is intersected. The coverage masks indicates the subpixels which the fragment intersects. The fragment may also include the color, blending modes, minimum and maximum z values for the object, texture, and other data. In a preferred embodiment, the depth value is a z value. However, nothing prevents the use of another measurement of depth, such as w or layer order, from being used as the depth value. The slope of the depth value indicates how the depth value for the fragment varies across the pixel. For example, where the depth value is z, the slope of the depth value preferably includes horizontal and vertical components, dz/dx and dz/dy, respectively. In a preferred embodiment, the slope of the depth value is constant. This eases the calculations discussed below. For planar polygons, the slope of the depth value is constant because the depth value varies linearly. However, the depth values for a polygon may not vary linearly if the polygon is not planar. However, over small distances, higher order functions can be approximated linearly. Thus, even where the depth values for the polygon do not vary linearly, the slope of the depth value can be a linear approximation of the actual slope of the depth value for the polygon of which the fragment is a part.

A plurality of subpixel depth values for a fragment intersecting a selected pixel are calculated, via step 210. The z mask unit 141 preferably carries out step 210. The subpixel depth values are calculated using the depth value and the slope of the depth value. In a preferred embodiment, a subpixel depth value is calculated for each subpixel using the horizontal and vertical components of the slope of the subpixel depth value and the depth value. For example, assume that the depth value for the fragment is $z_1$. This depth value is presumed to be for a particular point in the pixel. Each subpixel may be considered to be a distance of $ax_1$ and $by_1$ in the x and y directions, respectively, from the point at which the depth value has previously been calculated. In this case, a and b represent the number of subpixels in the x and y directions, respectively, between the point at which the depth value is known and the subpixel for which the subpixel depth value is calculated. The subpixel depth value is $z=z_1+ax_1(dz/dx)+ay_1(dz/dy)$. Note that a and b need not be integers. Thus, the subpixel depth value may be calculated a fractional number of subpixels from the point at which $z_1$ is taken evaluated. In a preferred embodiment, the subpixel depth value is calculated for each subpixel regardless of whether the coverage mask indicates that the fragment actually intersects that subpixel. However, in another embodiment, the subpixel depth value may be calculated for only those subpixels which the fragment intersects.

Once the subpixel depth values are known, it is determined whether to store the fragment via step 220. This determination is based on the subpixel depth values and the portion of the pixel that the fragment intersects. Preferably, this determination is made by the z mask unit 141 using the subpixel depth values and the coverage mask. Via step 225, a portion of the fragment is then stored for some or all of the subpixels if it was determined in step 220 that the fragment was to be stored. In order to store the portion of the fragment in step 225, data for the fragment is replicated for each of the appropriate subpixels and, using the blending unit(s) 144, stored in the corresponding subpixel buffers of the accumulator 142. For example, all subpixel buffers in which the fragment is stored in step 225 will hold the same color and texture values for the fragment. In a preferred embodiment, step 225 stores data for the fragment for each subpixel the fragment intersects and in which the depth value is less than a stored depth value. Step 225 may also include blending the data for translucent fragments.

Steps 210 through 225 are then repeated for each remaining fragment that intersects the pixel, via step 230. Thus, after step 230 is completed, the subpixel buffers in the accumulator 142 should hold data relating to the fragments which contribute to the pixel. Antialiased data for the pixel is then provided to the display 104, via step 240. In one embodiment, step 240 includes averaging the data in the subpixel buffers to provide the data for the pixel. Step 240 may also include providing the data for the pixel to memory in the display 104. In the preferred embodiment, a depth value is selected from one of the subpixel buffers as the depth value for the pixel. Selecting one of the depth values instead of providing an average should not adversely affect the data provided for the pixel because the depth values for the subpixels will probably be very similar. Furthermore, computation time is reduced.

Figure 4:
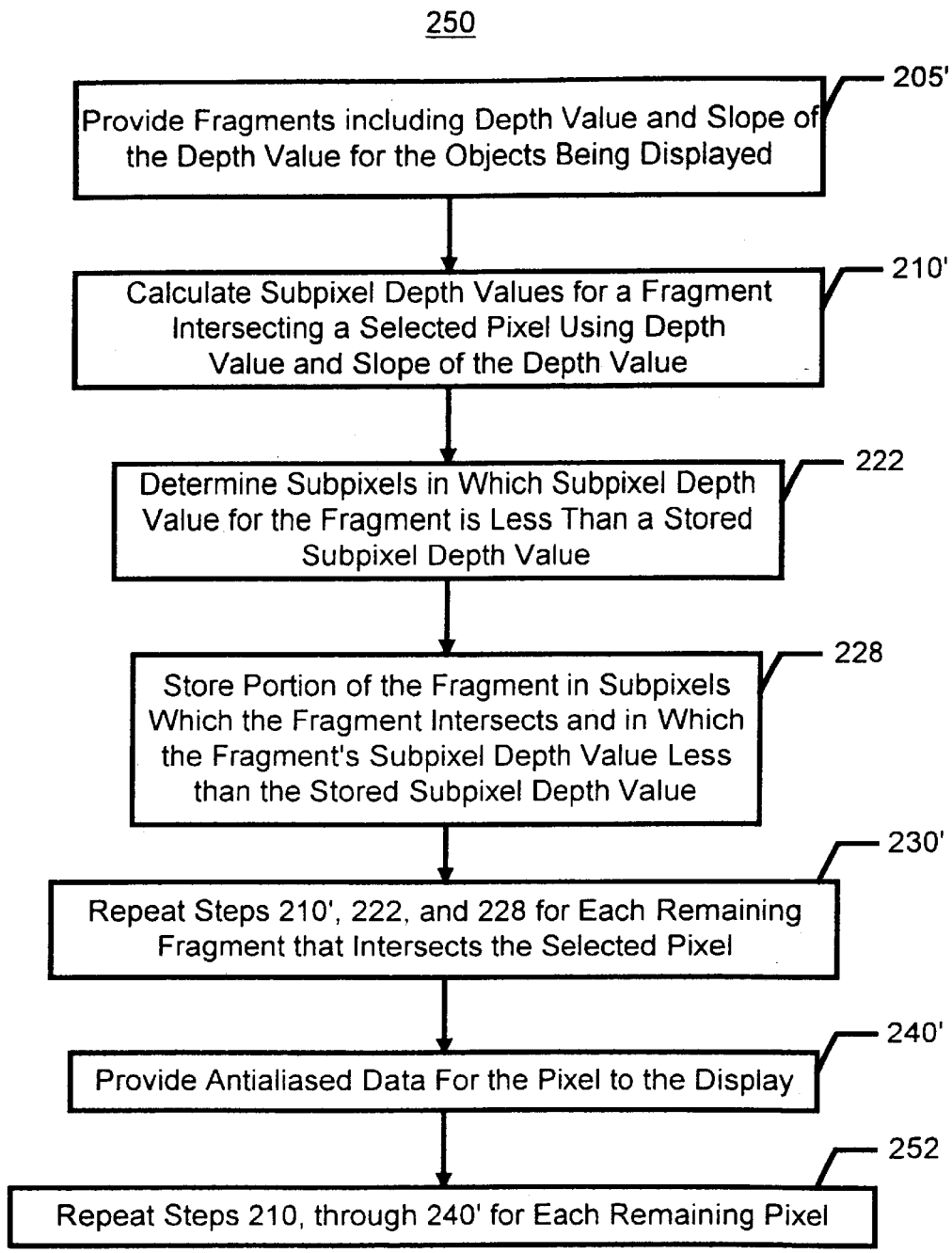
FIG. 4 is a more detailed flow chart depicting a method for providing a graphical display including antialiasing in accordance with the present invention.

FIG. 4 depicts a more detailed flow chart of a preferred embodiment of the method 250 for providing antialiasing that can antialias implicit edges. Fragments for the objects in the graphical image are provided, via step 205'. Step 205' corresponds to step 205 depicted in FIG. 3. Thus, each fragment includes a depth value, a slope of the depth value, and an indication of the portion of the pixel that the fragment intersects. In a preferred embodiment, each fragment includes the coverage mask, discussed above, as an indication of the extent to which the pixel is intersected. The coverage masks indicates the subpixels that the fragment intersects.

Referring back to FIG. 4, subpixel depth values are calculated for a fragment intersecting a selected pixel, via step 210'. Step 210' corresponds to step 210 of the method 200. In a preferred embodiment, the subpixel depth values are calculated for each subpixel regardless of whether the fragment actually intersects the subpixel. The subpixels which have a subpixel depth value less than a stored subpixel depth value and which the fragment intersects are then determined, via step 222. Steps 210' and 222 are preferably performed using the z mask unit 141. For the first fragment processed, step 222 will indicate that subpixel depth values are less than all stored subpixel depth values. This is because a background subpixel depth value which may be stored in the subpixel buffers will have a higher depth value. For subsequent fragments processed, the subpixel depth values may be less than the stored subpixel depth value in any number of the subpixels.

Via step 228, the fragment is stored in the subpixel buffers corresponding to the subpixels determined in step 222. Thus, the fragment is stored in subpixel buffers for subpixels in which the subpixel depth value calculated in step 210' is less than a stored subpixel depth value and which the fragment actually intersects. In order to store the fragment in step 228, the data for the fragment is replicated in the subpixel buffer(s) in which the fragment is to be stored. In addition, step 228 may include blending the fragment's data with data previously stored in each of the subpixel buffers if some of the fragments intersecting the subpixel buffer are translucent. Thus, color, texture, and other data relating to the fragment need not be independently evaluated at each subpixel. Instead, the fragment's' data is provided to the appropriate subpixels.

Steps 210' through 228 are then repeated for each remaining fragment that intersects the selected pixel, via step 230'. Antialiased data for the pixel is then provided, via step 240'. Step 240' is analogous to step 240 and may provide the antialiased data to a memory, such as a frame buffer, in the display 104 or directly to a monitor (not shown) or other mechanism for displaying the data to a user. Thus, the fragments intersecting the selected pixel are rendered. Steps 210' through 240' are then repeated for each remaining pixel, via step 252. Thus, each pixel in the display is rendered. Preferably, the method 250 renders the objects displayed pixel by pixel in raster order.

Figure 5:
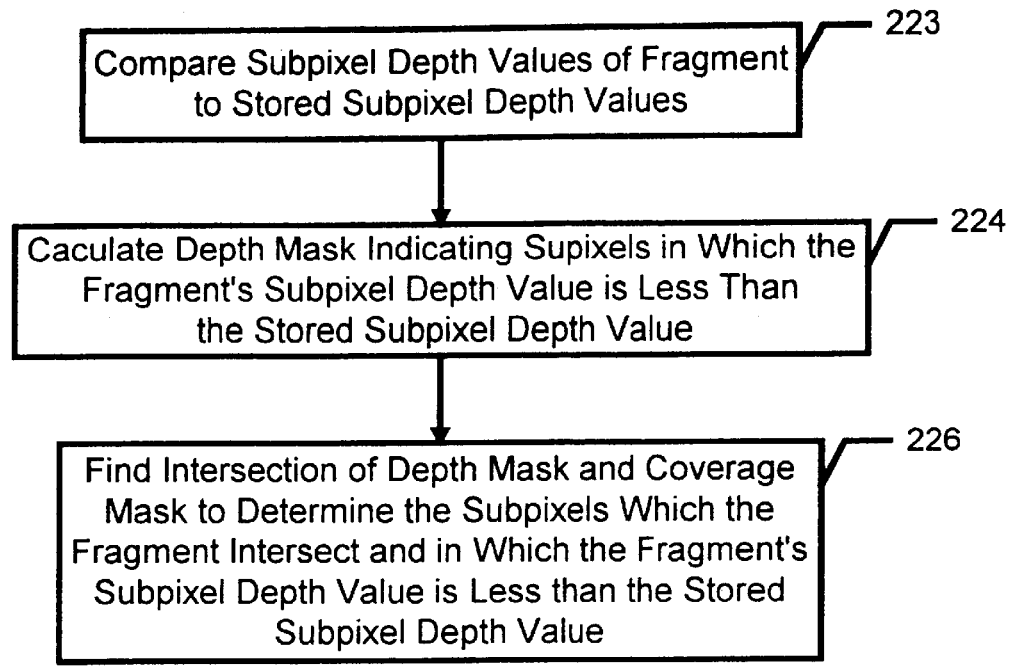
FIG. 5 is a flow chart depicting one embodiment of a method for performing the step of determining the subpixels in which the subpixel depth values for the fragment is less than stored subpixel depth values.

FIG. 5 depicts a preferred embodiment of step 222, determining the subpixels that have a subpixel depth value less than a stored subpixel depth value and that the fragment intersects. Using the z mask unit 141, a depth comparison for each subpixel is provided, via step 223. Step 223 includes comparing the subpixel depth values for the fragment to the stored subpixel depth values from a previous fragment or the background. A depth mask is then generated, via step 224. The depth mask indicates the subpixels in which the subpixel depth value for the fragment is less than a stored subpixel depth value. In a preferred embodiment, the depth mask includes a one for each subpixel for which the fragment's subpixel depth value is less than the stored subpixel depth value. The intersection between the depth mask for the fragment and the coverage mask for the fragment is then determined, via step 226. Preferably, step 226 includes performing a logical AND between the depth mask and the coverage mask. The logical AND performed in step 226 can generate a total mask indicating the subpixels that the fragment intersects and for which the subpixel depth value for the fragment is less than a stored subpixel depth value. In a preferred embodiment, the z mask unit 141 includes its own accumulator (not shown) storing depth information for each subpixel. The comparison performed in step 223 compares the subpixel depth values for the fragment with the subpixel depth values stored in the accumulator of the z mask unit 141. The depth mask is calculated based on this comparison. The intersection of the depth mask and the coverage mask can be used to update the depth values stored in the accumulator of the z mask unit 141 as well as to determine which subpixel buffers of the accumulator will be updated. Note that the total mask generated in step 226 can be viewed as a modification of the coverage mask for the fragment. The coverage mask is modified by the z mask. Thus, the function of the z mask unit 141 can be considered to be modifying the coverage mask based on the subpixel depth values for the fragment. Once the total mask has been generated, data for the fragment is stored in the subpixel buffers using step 228 of the method 250.

Because the depth value is accounted for at the subpixel level, implicit edges may be antialiased. Data such as color or texture for the fragments are simply stored in the appropriate subpixels, rather than being independently evaluated for each subpixel. For example, for each fragment there is a single color in each of the appropriate subpixels. Consequently, the methods 200 and 250 in accordance with the present invention are less calculation intensive than conventional supersampling. The methods 200 and 250 in accordance with the present invention are faster and require less memory than conventional supersampling.

Figure 6A:
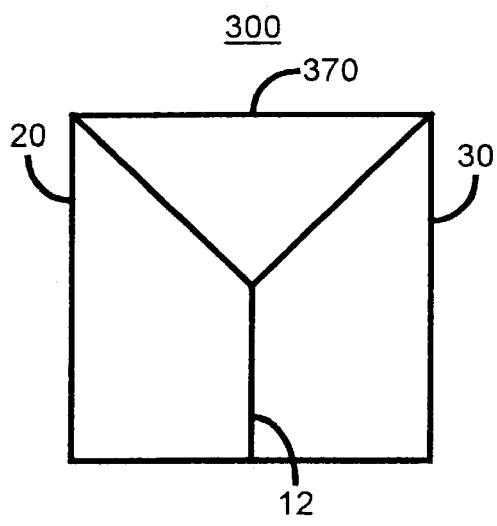
FIG. 6A is a diagram of a pixel in the display of a computer graphics system in which two polygons and an implicit edge are desired to be shown.
Figure 6B:
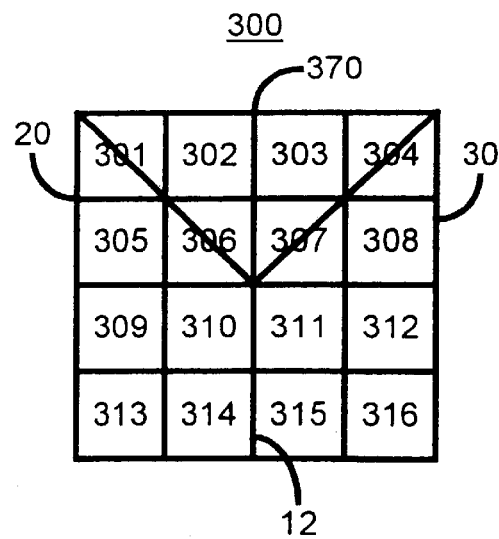
FIG. 6B is a diagram of the pixel of FIG. 6A in addition to subpixels within the pixel.

To further describe the method and system in accordance with the present invention, refer to FIG. 6A depicting a pixel 300 in which a portion of the two polygons 20 and 30 intersect. Thus, the pixel 300 depicts a portion of the implicit edge 12 and portions of the polygons 20 and 30. The pixel 300 also includes a background 370. FIG. 6B also depicts the pixel 300, the polygons 20 and 30, the implicit edge 12, and the background 370. FIG. 6B also depicts sixteen subpixels 301 through 316 within the pixel 300. In the following discussion, it is presumed that the fragment for the polygon 20 is processed first, followed by the fragment for the polygon 30.

Figures 7A, 7B, 7C, 7D:
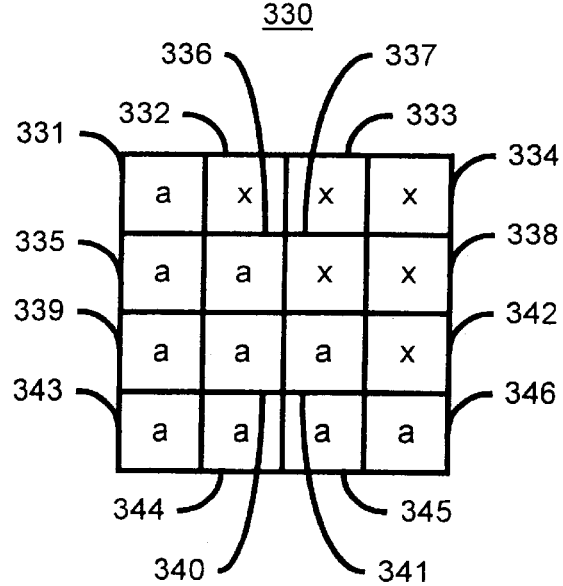
FIG. 7A is a diagram of a coverage mask indicating the portion of the pixel that the first polygon intersects.
FIG. 7B is a diagram of a second mask indicating the subpixels in which the first polygon would or does have a subpixel depth value which less than a stored subpixel depth value.
FIG. 7C is a diagram of the intersection of the coverage and second masks for the first polygon.
FIG. 7D is a diagram of the data stored in the subpixel buffer including data for the first polygon.

FIGS. 7A through 7C depict masks for the fragment for polygon 20. FIG. 7A depicts the coverage mask 320 for the polygon 20. The coverage mask 320 includes ones in the subpixels 301, 305–306, 309–311, and 313–316. Thus, the polygon 20 covers the lower left half of the pixel 300.

FIG. 7B depicts the depth mask 322 for the fragment for the polygon 20. The depth mask 322 is generated in step 224 of FIG. 5. Referring back to FIG. 7B, because the fragment for the polygon 20 is processed first, the subpixel depth values for the polygon 20 will be less than the stored (background) subpixel depth values for each subpixel. Consequently, the depth mask 322 has a one for each of the subpixel 301–316.

In order to determine for which subpixels the fragment's data is to be stored, the coverage mask 320 and the depth mask 322 are intersected using step 226 of FIG. 5. FIG. 7C depicts the total mask 324 generated by the intersection. The total mask 324 has ones for each subpixel in which both the coverage mask 320 and the depth mask 322 has a one. Consequently, the total mask has ones for subpixels 301, 305–306, 309–311, and 313–316.

FIG. 7D depicts the subpixel buffers 331–346 in the accumulator 142 after the portion of the fragment for the polygon 20 has been stored using step 228 of FIG. 4. Referring back to FIG. 7D, an "a" indicates data from the fragment for the polygon 20. An "x" indicates background data. As indicated by the mask 324, data for the fragment for the polygon 20 has replaced background data in the subpixel buffers 331, 333–334, 339–341, and 343–346.

Figures 8A, 8B, 8C, 8D:
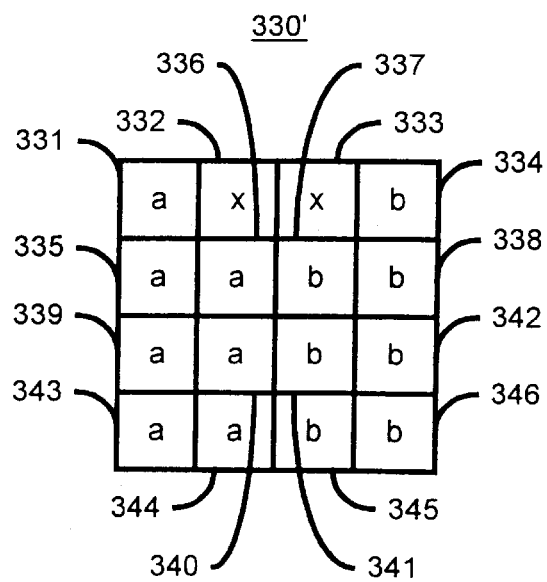
FIG. 8A is a diagram of a coverage mask indicating the portion of the pixel that the second polygon intersects.
FIG. 8B is a diagram of a second mask indicating the subpixels in which the second polygon would or does have a subpixel depth value which less than a stored subpixel depth value.
FIG. 8C is a diagram of the intersection of the coverage and second masks for the second polygon.
FIG. 8D is a diagram of the data stored in the subpixel buffer including data for the second polygon.

Next, the fragment for the polygon 30 is processed. FIGS. 8A through 8C depict masks for the fragment for polygon 30 in the pixel 300. FIG. 8A depicts the coverage mask 350 for the polygon 30. The coverage mask 350 includes ones in the subpixels 304, 307–308, 310–312, and 313–316. Thus, the polygon 30 covers the lower right half of the pixel 300.

FIG. 8B depicts the depth mask 352 for the fragment for the polygon 30. The depth mask 352 is generated in step 224 of FIG. 5. Referring back to FIG. 8B, the polygon 30 has subpixel depth values that are less than the background. In the right half of the pixel 300, the polygon 30 has subpixel depth values that are less than the subpixel depth values for the polygon 20. The subpixel depth values for the polygon 30 will be less than the stored subpixel depth values in every subpixel containing data for the background and in the subpixels containing data for the polygon 20 that are in the right half of the pixel 300. Consequently, the depth mask 352 has a one for each the subpixels 302–304, 307–308, 311–312, and 315–316.

To determine the subpixels in which the fragment's data is to be stored, the coverage mask 350 and the depth mask 352 are intersected using step 228 of FIG. 5. FIG. 8C depicts the total mask 354 generated by the intersection. The total mask 354 has ones for each subpixel in which both the coverage mask 350 and the depth mask 352 has a one. Consequently, the total mask 352 has ones for subpixels 304, 307–308, 311–312, and 315–316.

FIG. 8D depicts the subpixel buffers 331–346 in the accumulator 142 after a portion of the second polygon 30 has been stored using step 228 of FIG. 4. Referring back to FIG. 8D, a "b" indicates data from the fragment for the polygon 30. As indicated by the mask 354, data for the fragment for polygon 30 replaces background data in the subpixel buffers 334, 337–338, and 342. Data for the fragment for polygon 30 also replaces data from the fragment for the first polygon 20 in subpixel buffers 341, 345, and 346. Since fragments for both polygons 20 and 30 that intersect the pixel 300 have been processed, the final antialiased data for the pixel 300 can be provided from the subpixel buffers 331–346 using step 240 or 240' of the methods depicted in FIGS. 3 and 4. Referring back to FIG. 8D, the data in each of the subpixel buffers may be combined and averaged or otherwise blended to provide antialiased data for the pixel.

Because the variation in depth values over a pixel are accounted for, the method and system in accordance with the present invention allow for antialiasing implicit edges as well as explicit edges or lines. Furthermore, the subpixel depth values are calculated for antialiasing. The subpixels depth values are not stored with the fragment throughout processing. Since the slope of the depth value is presumed constant across a pixel, the slope of the depth value need not be calculated for each subpixel. Where the polygons are also planar, the slope of the depth value can be calculated only once for the entire polygon. Other attributes, such as color and texture, are also not evaluated individually at each subpixel. Instead, the data for the fragment is simply copied for the appropriate subpixels. Therefore, the method and system in accordance with the present invention requires less time and consumes less memory than conventional supersampling. Therefore, antialiasing of implicit edges can be accomplished more quickly and without utilizing as much memory.

A method and system has been disclosed for providing antialiasing which uses masks and the depth values for each subpixel. Because only the slope of the depth value is stored within the fragment, less memory is required to store a particular fragment. Furthermore, antialiasing of implicit edges can be provided in a system which uses less memory than conventional supersampling. Furthermore, since the same values for color, texture, and data in a fragment other than the z value can be replicated at each subpixel, computation time is reduced. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing antialiasing of a graphical image on a display from data describing at least one object, the display including a plurality of pixels, a plurality of fragments intersecting the at least one object, a portion of the plurality of fragments intersecting a pixel of the plurality of pixels, each of the plurality of fragments including a depth value, a slope of the depth value, and an indication of a portion of a corresponding pixel that is intersected, the method comprising the steps of:

(a) calculating a plurality of subpixel depth values for a fragment of the plurality of fragments, the plurality of subpixel depth values calculated using the depth value and the slope of the depth value of the fragment;

(b) determining whether to store a portion of the fragment based on the plurality of subpixel depth values and the indication of the portion of the corresponding pixel that is intersected for the fragment;

(c) storing the portion of the fragment if it has been determined in step (be) that the portion of the fragment is to be stored; and (d) providing antialiased data for the pixel based on a second portion of the plurality of fragments that have been stored.

2. The method of claim 1 wherein the method further includes the steps of:

(e) repeating steps (a) through (d) for each remaining pixel of the plurality of pixels.

3. The method of claim 1 wherein each of the plurality of pixels can be divided into a plurality of subpixels, wherein the indication of the extent the corresponding pixel is intersected includes a coverage mask, the coverage mask indicating a first portion of the plurality of subpixels which the fragment intersects and wherein the determining step (b) further includes the steps of:

(b1) determining a second portion of the plurality of subpixels in a portion of the plurality of subpixel depth values is less than a portion of a plurality of stored subpixel depth values, the second portion of the plurality of subpixels being within the first portion of the plurality of subpixels; and wherein the storing step (c) includes the step of (c1) storing the portion of the fragment for the second portion of the plurality of subpixels.

4. The method of claim 3 wherein the determining step (b1) further includes the step of:

(b1i) comparing the plurality of subpixel depth values to the plurality of stored subpixel depth values to determine a third portion of the plurality of subpixels in which a corresponding subpixel depth value of the plurality of subpixel depth values is less than a corresponding stored subpixel depth value of the plurality of stored subpixel depth values;

(b1ii) providing a second mask for the fragment, the second mask indicating the third portion of the plurality subpixels; and (b1iii) using the coverage mask and the second mask for the fragment to determine the second portion of the plurality of subpixels.

5. The method of claim 4 wherein the determining step (b1ii) further includes the step of:

(b1iia) performing an AND operation for the coverage mask and the second mask.

6. The method of claim 3 wherein the antialiased data providing step (d) further includes the step of:

(d1) averaging information stored relating to the portion of the plurality of fragments that intersect the pixel.

7. The method of claim 3 wherein the antialiased data providing step (d) further includes the steps of:

(d1) averaging currently stored information, other than the depth value, relating to the portion of the plurality of fragments that intersect the pixel; and (d2) selecting a currently stored median subpixel depth value as the depth value for the pixel.

8. A system for providing antialiasing of a graphical image on a display from data describing at least one object, the display including a plurality of pixels, a plurality of fragments intersecting the at least one object, a portion of the plurality of fragments intersecting a pixel of the plurality of pixels, each of the plurality of fragments including a depth value, a slope of the depth value, and an indication of a portion of a corresponding pixel that is intersected, the system comprising:

at least one processor for calculating a plurality of subpixel depth values for a fragment of the plurality of fragments, the plurality of subpixel depth values calculated using the depth value and the slope of the depth value of the fragment;

an antialiasing unit for determining whether to store a portion of the fragment based on the plurality of subpixel depth values and the indication of the portion of the corresponding pixel that is intersected for the fragment, storing the portion of the fragment if it has been determined that the portion of the fragment is to be stored and providing antialiased data for the pixel based on a second portion of the plurality of fragments that have been stored.

9. The system of claim 8 wherein the antialiasing unit further includes:

a z unit mask for determining whether to store a portion of the fragment based on the plurality of subpixel depth values and the indication of the portion of the corresponding pixel that is intersected for the fragment.

10. The system of claim 9 wherein the antialiasing unit further includes:

an accumulator for storing the portion of the fragment if it has been determined that the portion of the fragment is to be stored.

* * * * *